United States Patent [19]

Ackley, Sr. et al.

[11] 4,231,462
[45] Nov. 4, 1980

[54] CAPSULE POSITIONING GUIDE AND ASSOCIATED VACUUM MANIFOLD FOR CAPSULE ORIENTING MECHANISMS

[75] Inventors: Charles E. Ackley, Sr., Oreland; Charles E. Ackley, Jr., Philadephia, both of Pa.

[73] Assignee: R. W. Hartnett Company, Philadelphia, Pa.

[21] Appl. No.: 905,742

[22] Filed: May 15, 1978

[51] Int. Cl.$^2$ ............................................. B65G 47/14
[52] U.S. Cl. .................................. 198/380; 198/384; 198/397; 221/173
[58] Field of Search ............... 198/380, 384, 393, 397, 198/400; 221/156, 157, 173; 271/174

[56] References Cited

U.S. PATENT DOCUMENTS

| | | | |
|---|---|---|---|
| 2,785,786 | 3/1957 | Bartlett | 221/157 X |
| 2,859,689 | 11/1958 | Ackley | 101/35 |
| 3,871,295 | 3/1975 | Ackley | 198/380 X |
| 3,931,884 | 1/1976 | Ackley | 198/380 |
| 3,948,507 | 4/1976 | Stange | 271/174 |
| 4,104,966 | 8/1978 | Ackley, Jr. et al. | 198/380 X |

Primary Examiner—Jeffrey V. Nase
Attorney, Agent, or Firm—Miller & Prestia

[57] ABSTRACT

In a turning and orienting apparatus of the type adapted to transport capsules in a plurality of pockets or the like, which pockets are formed in a continuously moveable transport conveyor, and wherein said apparatus is further adapted to rectify the capsules, which have body portions and cap portions of greater transverse dimensions than the body portions, and wherein a vacuum is provided to shift the capsules into the desired rectified position, a capsule positioning guide is provided to retain each capsule in its pocket immediately prior to its being subjected to the vacuum. The capsule positioning guide then releases the capsule as it is subjected to the vacuum. In a preferred embodiment of the invention, the capsule positioning guide is pivotally mounted adjacent the capsule transport conveyor so that it can be easily moved out of its operative condition adjacent the transport conveyor for easy cleaning thereof.

10 Claims, 5 Drawing Figures

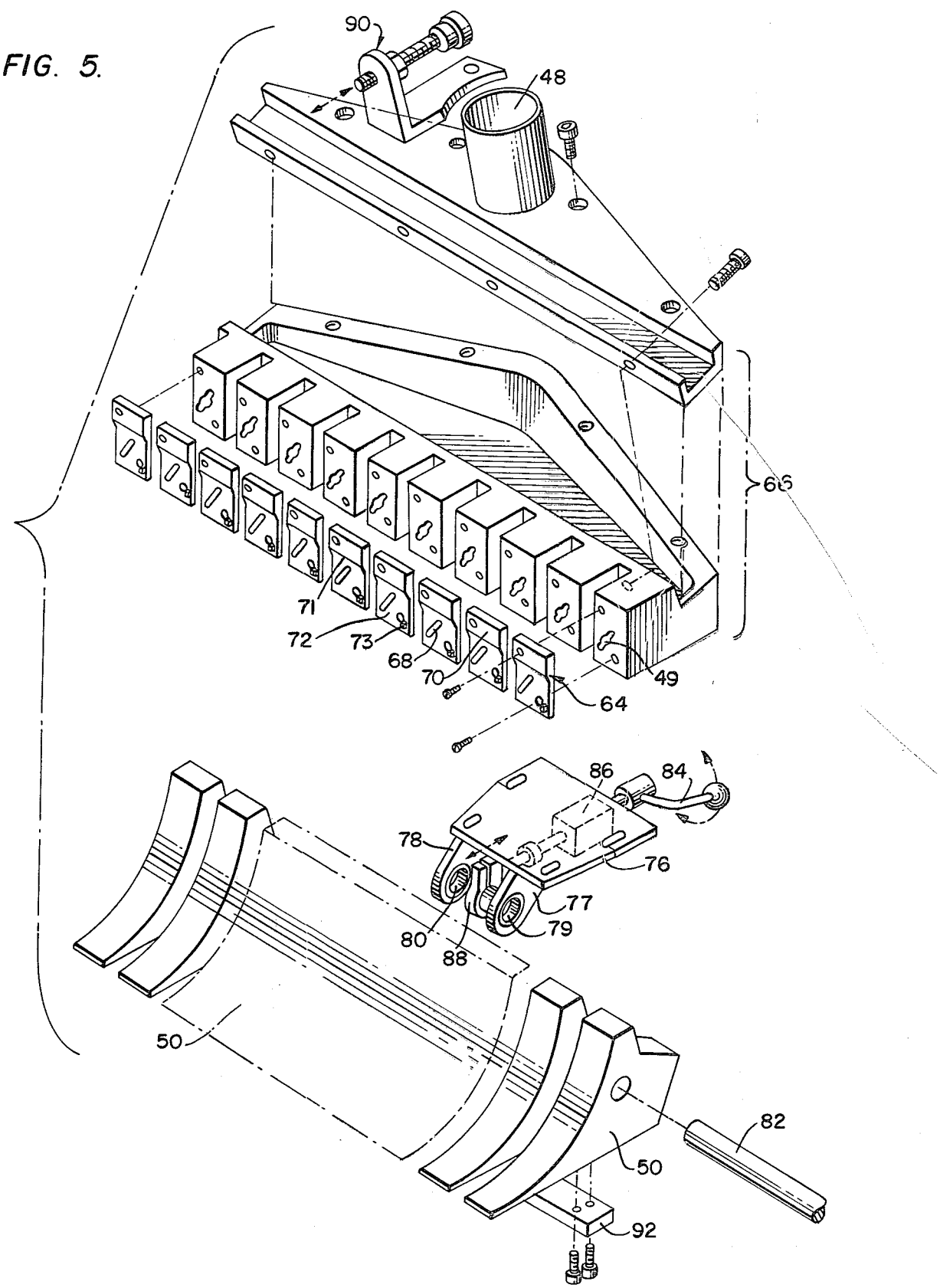

CAPSULE POSITIONING GUIDE AND ASSOCIATED VACUUM MANIFOLD FOR CAPSULE ORIENTING MECHANISMS

BACKGROUND OF THE INVENTION

This application pertains to devices which are adapted to transport and rectify capsules having body portions and cap portions of greater transverse dimensions than the body portions. Rectification, as is known in the art, is a process in which all cap portions of each capsule are aligned in a certain predetermined position and in which all body portions of the capsules are aligned in another predetermined position. According to the invention, an apparatus is provided to rectify the capsules by shifting the capsules into the desired dispositions by use of a vacuum means as the capsules are carried in pockets or the like formed in a continuously rotatable transport cylinder. Immediately prior to being subjected to the vacuum means, the capsules are retained in their respective pockets by means of the capsule positioning guide means in accordance with the present invention. The capsule positioning guide means then releases the capsules as they are subjected to the vacuum so that rectification thereof can be effected.

U.S. Pat. No. 2,859,689 (Ackley) discloses a device in which a multiplicity of pellets or similar articles are transported by means of a rotatable cylinder and an endless conveyor and then are presented to a printing means whereby the desired indicia, such as trademarks, lot numbers, etcetera, are imprinted upon the pellets. The rotatable cylinder is provided with a plurality of pockets into which the pellets are received from a hopper member. After approximate 180° rotation on the transport cylinder, the pellets are transferred to the endless conveyor which presents the pellets to the printing station.

In U.S. Pat. No. 3,871,295 (Ackley), a capsule rectification apparatus is disclosed wherein the capsules are transferred from a hopper to a rotatable cylinder having capsule receiving pocket portions. The capsules are randomly received in pocket portions that are radially disposed with respect to the transport cylinder. The capsules may be disposed in either the "caps up" or "caps down" position. An air jet shifts the body portions of the "caps down" capsules into pocket portions which are oriented in the direction of movement of the rotatable cylinder so that the cap portions can subsequently be shifted in a sidewise direction by a subsequent sideward directed air jet. Those capsules which are in "caps up" position in the radial pocket portions are not affected by the first air jet because of a barrier which prevents their movement; the cap portions of these "caps up" capsules are subsequently blown sideways by a sidewardly directed air stream. In this way, the positions of the capsules are rectified, with all of the cap portions on one side of a predetermined path and all of the body portions on the other side of the predetermined path.

In our co-pending application Ser. No. 672,017 filed Mar. 30, 1976, allowed Feb. 27, 1978, now U.S. Pat. 4,104,966 a capsule rectification apparatus is disclosed wherein a vacuum means is provided to effect sidewise shifting of the capsules as they are carried in their respective pockets located in the rotatable conveyor. The disclosed device provides significant improvements in overall speed and rectification efficiency. However, it is not without some problems. For instance, sometimes, a capsule can stick in its pocket on the rotatable cylinder during the vacuum shifting operation and thus is not properly rectified. Further, dust sometimes collects in the mechanism, along the interface of the rotatable conveyor and the vacuum source. Dust accumulation adversely affects both speed and rectification efficiency of the apparatus. This dust is also difficult to eliminate, as it requires disassembly of certain parts of the apparatus prior to cleaning thereof.

Accordingly, it is an object of the present invention to provide a capsule rectification apparatus of improved efficiency.

It is a further object to provide such a device wherein certain machine components, located along the conveyor-vacuum interface, may be pivoted into and out of position so that accumulated dust and the like can be readily removed therefrom.

These and other objects will become more apparent hereinafter in the detailed description and appended drawings.

DESCRIPTION OF THE DRAWINGS

In the drawings,

FIG. 5 is an exploded perspective view of the capsule positioning guide means and associated vacuum manifold also showing the means for pivotally mounting same to the mechanism.

DETAILED DESCRIPTION

Figure 1:
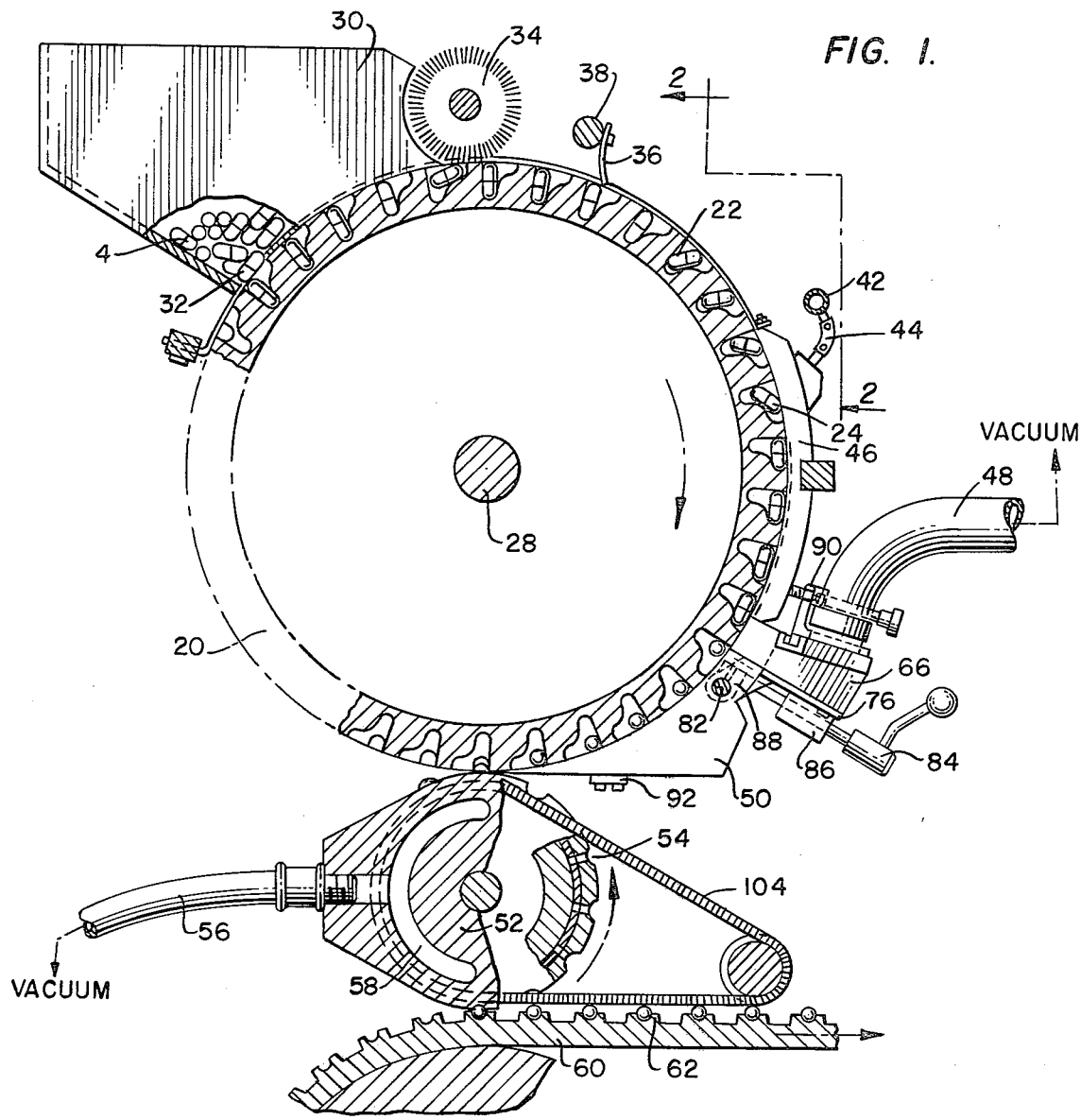
FIG. 1 is a vertical transverse sectional view taken through a machine embodying features of this invention.

In the specification which follows, specific terms will be used for the sake of clarity, and as descriptions of the specific forms of the invention which have been selected for illustration in the drawings. However, the use of such specific terms, and the use of such specific embodiments in the drawings, is not intended to imply any limitations with respect to the scope of the invention which is defined in the claims.

The present invention provides significant improvements over the basic vacuum rectification mechanism disclosed in our aforementioned U.S. Pat. No. 4,104,966. The entire disclosure of this patent is hereby incorporated by reference.

Figure 2:
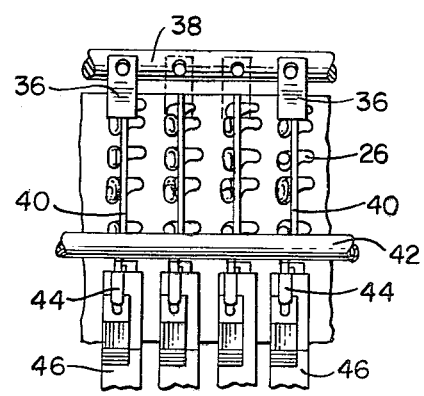
FIG. 2 is a fragmentary sectional view of a portion of the transport cylinder appearing in FIG. 1, taken along the lines and arrows 2—2, of FIG. 1.

Turning now to FIG. 1 of the drawings, there is shown a continuously rotatable transport cylinder 20 provided with radially oriented pocket portions 22, pockets extending in the rotational direction of the cylinder (hereinafter transport oriented pockets 24), and axial oriented pockets 26 (FIG. 2). The transport cylinder 20 is rotatably mounted on cylinder roll shaft 28, which shaft 28 is journaled in two side frame members as shown in U.S. Pat. No. 2,859,689.

A hopper 30 is positioned above the transport cylinder 20 and has an opening 32 in the bottom portion thereof, through which, capsules 4 fall and are received in the pockets of the cylinder 20. A rotatable brush 34 (FIGS. 1 and 2) is positioned immediately to the right of the hopper 30 as shown in FIG. 1. The brush bristles gently impinge upon the surface of the cylinder 20 and brush improperly aligned capsules into the radial pockets 22.

As is clearly shown in FIG. 2, tabs 36 positioned on shaft 38, extend across the width of the cylinder 20 and bear against the capsules 4 so that the capsules are properly seated in the radial pockets 22. Alignment wires 40 extend in the transport direction of the cylinder 20 to prevent the capsules 4 from falling into the axial pocket portions 26.

Downstream from the alignment wires 40, a fluid manifold 42 and connecting fluid jet conduits 44 are positioned to supply a transport direction oriented stream of fluid upon the capsules. Gauging blocks 46 are positioned adjacent the cylinder surface to prevent forward tilting of "caps up" capsules into the transport oriented pockets 24 and to allow tilting of the body portions of the "caps down" capsules into the transport oriented pocket portions 24. The gauging blocks 46 also act as a means of inhibiting stray and eddy currents, which may develop from the fluid manifold 42 and fluid jet conduits 44, from affecting the neighboring rows of pockets as described in our aforementioned U.S. Pat. No. 4,104,966.

Downstream from the gauging block assembly 46, vacuum source 48 is positioned. This vacuum draws upon the capsules 4 as they exit from the gauging block assembly to shift the capsules in a sidewise direction into the axial pockets 26 in rectified position as described in our aforementioned U.S. Pat. No. 4,104,966.

Downstream from the vacuum 48, capsule retaining means 50 are provided to hold the capsules in the cylinder pockets as they move toward the downside of the rotatable cylinder, prior to transfer to transfer cylinder 52 and the pocket members 54 associated therewith. Vacuum source 56 and communicating vacuum shoe 58 facilitate transfer of the capsules 4 from the cylinder 20 to the pocket members 54 as the vacuum source 56 draws upon the capsules 4 after they pass the capsule retaining means 50 which is positioned adjacent the cylinder 20.

An endless conveyor 60 and associated capsule carrier 62 are disposed below the cylinder 52. Capsules are transferred to the capsule carriers 62 after an approximate 180° journey about the transfer cylinder 52. Rotatable chain 104 facilitates this transfer as it acts as a means to pry capsules out of the pockets 54 and place the capsules into carriers 62 as disclosed in the aforementioned U.S. Pat. No. 4,104,966. The capsules 4 are then transported to the right as shown in FIG. 1 to be presented to other work stations which may include "wrap around" and/or "on end" printing stations.

Figure 3:
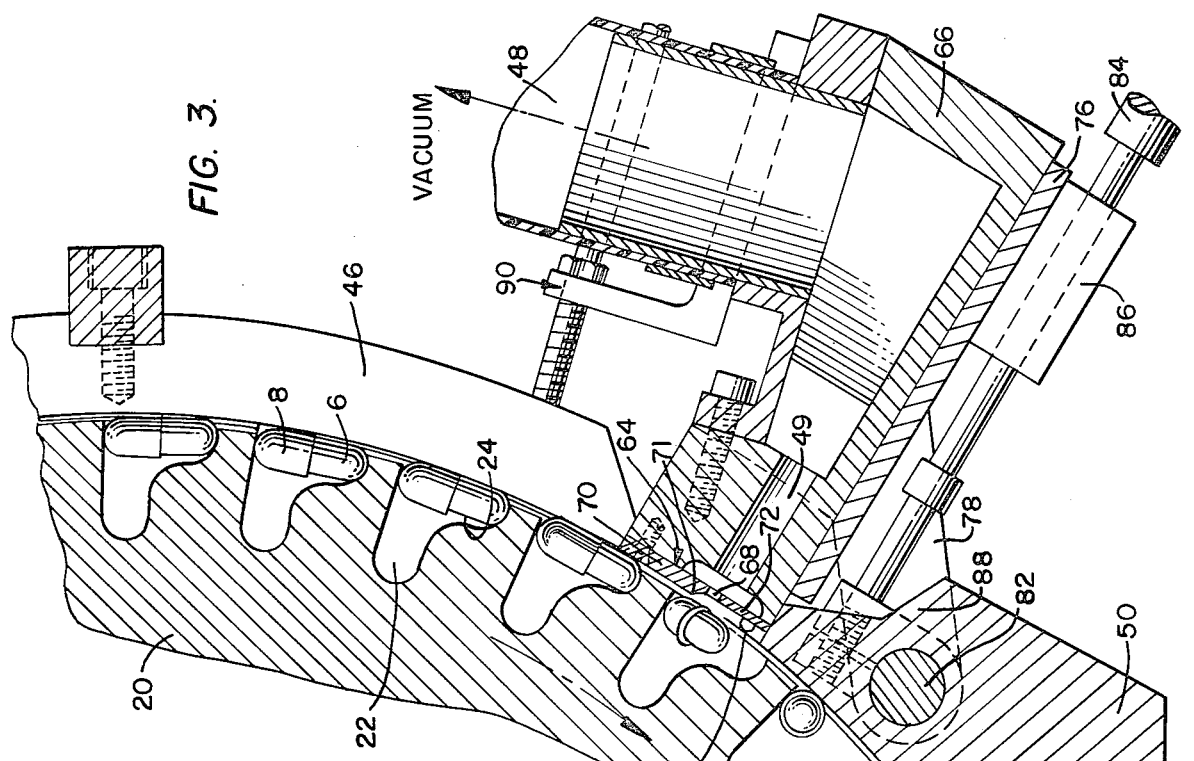
FIG. 3 is an enlarged vertical transverse sectional view of the apparatus shown in FIG. 1, particularly highlighting the structural relationship between the vacuum source and capsule positioning guide means in accordance with the invention.

Turning our attention now to FIG. 3, it can be seen that the capsules 4 comprise body portions 6 and cap portions 8 of greater transverse dimension than the body portions. In this Figure, a capsule is shown with the body portion 6 extending in the transport oriented pocket portion 24. As is described in U.S. Pat. No. 4,104,966, the capsules exit the gauging block assembly in either one of two positions; they can exit as shown in FIG. 3, or they can be disposed in "caps up" disposition in the radial pocket 22. Regardless of which of the above positions the capsules are in as they move out of the gauging assembly 46, the cap portions of all of the capsules are drawn upon by the vacuum 48 so as to rectify the capsules in the axial pockets with all of the caps 8 extending in one predetermined direction and with all of the bodies 6 extending in the opposite direction.

Immediately downstream from the gauging assembly 46 and interposed between cylinder 20 and vacuum source 48 and associated conduit 49 is capsule positioning guide means 64. As shown in FIG. 3, the capsule positioning guide means 64 is threaded to vacuum manifold 66. A slot 68 in the capsule positioning guide means 64 is in communication with vacuum conduit 49 so that the capsule is affected by the vacuum drawn through the slot.

The capsule positioning guide means 64 comprises a plate having a first portion 70 having a thickness sufficient to bear upon the capsule as it exits the gauging assembly 46. This portion 70 retains the capsule in its pocket portion immediately prior to its being subjected to the vacuum. A ridge 71 is provided in the capsule positioning guide means 64 so as to gently bump the capsule prior to its being subjected to the vacuum. Downstream from the portion 70 and ridge 71, and aligned with the vacuum conduit 49, the capsule positioning guide means is provided with a second portion 72 which is thinner in dimension than portion 70. The relative thinness of this portion 72 allows the capsule to be easily drawn upon by the vacuum. Protuberance 73 is provided on the second portion 72 so as to bump any capsules that have not been rectified to jar the non-rectified capsules back into the area of slot 68 so as to be affected by vacuum 48.

As best shown in FIGS. 3 and 5, a support assembly 76 is attached to the underside of the vacuum manifold 66. The support assembly comprises two support legs 77, 78 with bores 79, 80 therein. The legs 77, 78 are mounted on shaft 82 which spans across the side frames, which side frames are shown in U.S. Pat. No. 2,859,689.

A lever 84 is received in boss 86 which is integral with the support assembly 76, and the threaded end of the lever is received in the ring clamp 88 which is also mounted on the shaft 82. Accordingly, it will be appreciated that the capsule positioning guide means 64 and associated vacuum manifold 66 can be pivoted into and out of its position adjacent the cylinder 20 by manipulation of the lever 84 so that the capsule positioning guide means-vacuum manifold assembly may be easily cleaned.

An adjustable stop member 90 is carried by the vacuum manifold 66 and bears against the gauging assembly 46 when the capsule positioning guide means-vacuum manifold assembly is in its operative position. This stop member 90 allows accurate adjustment of the spacing between the surface of the cylinder 20 and the capsule positioning guide means 64. Also mounted on the shaft 82 are the arcuate capsule retention means 50. The retention means are also threaded to transverse bar 92.

Figure 4:
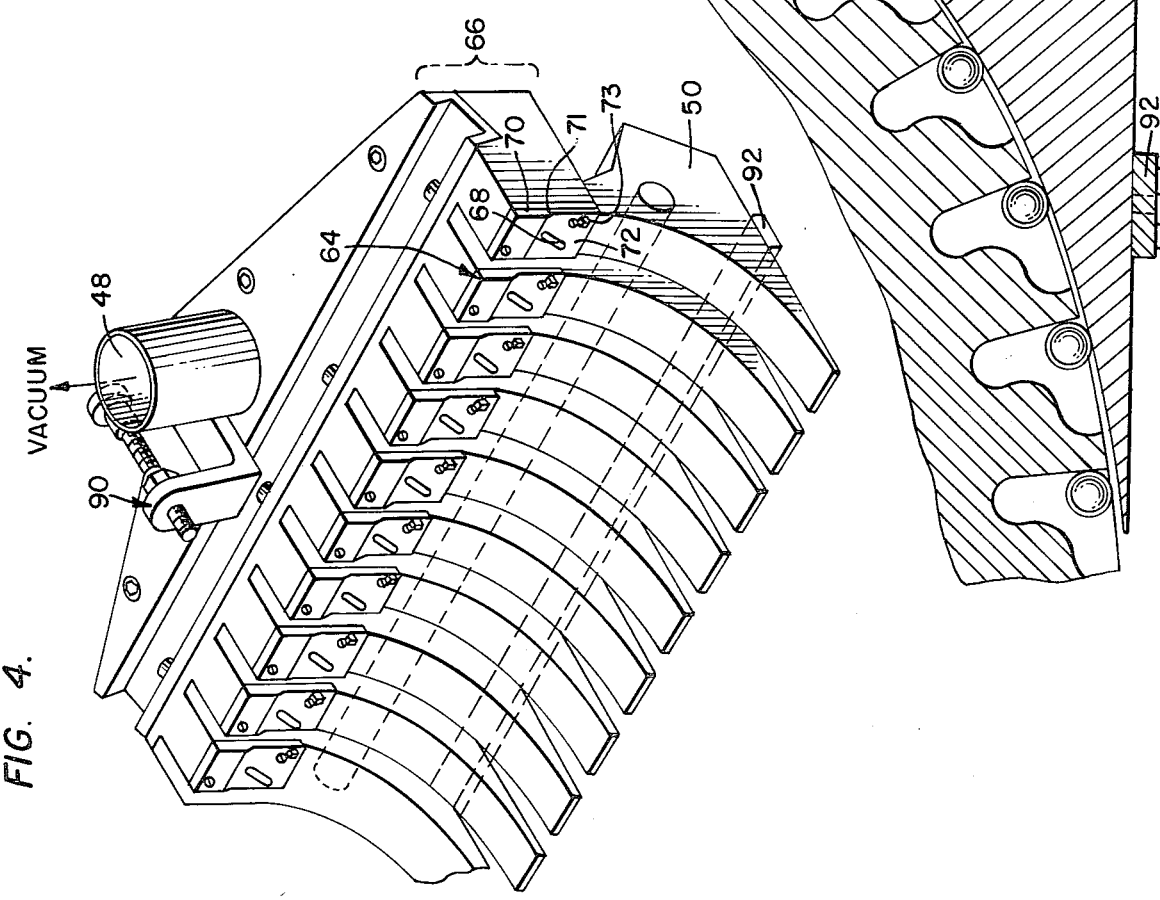
FIG. 4 is a perspective view of the capsule positioning guide means and associated vacuum manifold which appear in FIGS. 1 and 3.

With reference to FIGS. 4 and 5, it can be seen that when a plurality of adjacent rows of pockets on the cylinder 20 are provided, a corresponding number of capsule positioning guide means 64 are mounted on the vacuum manifold 66. One capsule positioning guide means 64 is provided for each row of pockets on the cylinder 20.

It will be appreciated that other modifications may be made in the form of the "Capsule Positioning Guide And Associated Vacuum Manifold For Capsule Orienting Mechanisms" herein disclosed, including reversible parts and substitutions of equivalent members, and the use of certain features of the invention may be used independently of others, all within the spirit and scope of the invention as defined in the appended claims.

We claim:

1. In a capsule orienting and turning apparatus wherein said capsules have body portions and cap portions which are of greater transverse dimensions than said body portions, and wherein said apparatus comprises, hopper means into which a multiplicity of said capsules are to be loaded, a continuously moveable capsule transporting conveyor having a plurality of pockets having generally upright pocket portions for receiving the capsules therein, said pockets being substantially equally spaced apart, each said pocket also having a capsule receiving substantially longitudinal pocket portion arranged to carry the capsule with the capsule axis extending in approximately the direction of its movement, and each said pocket having a substantially crosswise pocket portion arranged to carry the capsule arranged substantially crosswise of the direction of its movement, means for moving said conveyor along a predetermined path with some of the capsules in a caps up attitude and others with a caps down attitude, the combination which comprises: tilting means for tilting the caps down capsules into an attitude arranged generally along said predetermined path, means for substantially restraining said caps up capsules from such tilting movement, vacuum rectification means directed to draw transversely of said predetermined path to rectify said capsules by shifting the cap portions of those capsules which are in a caps up position, and also the cap portion of those capsules which have been tilted by said tilting means, all in a direction generally crosswise with respect to said predetermined path, and capsule positioning guide means interposed between said transport conveyor and said vacuum means for retaining each said capsule in its respective pocket portion immediately prior to its being subjected to said vacuum rectification means and then releasing said capsule when it is subjected to said vacuum rectification means, said vacuum rectification means comprising a vacuum manifold, said capsule positioning guide means being carried by said vacuum manifold, means pivotally connecting said vacuum manifold and said transport conveyor, a pair of side frame members, said transport conveyor being a rotatable cylinder, a shaft connecting said side frame members and located adjacent said rotatable cylinder, said vacuum manifold attached to said shaft by said pivotal connection means and wherein said pivotal connection means comprise a support assembly connected to said vacuum manifold and said shaft, a ring clamp mounted on said shaft, and a manually engageable pivot lever received in said support assembly and extending into said ring clamp whereby pivotal movement of said lever acts to connect and disconnect, on a mutually exclusive basis, said lever from said ring so that said vacuum manifold can be pivotally moved out and into position adjacent said rotatable cylinder.

2. In a capsule orienting and turning apparatus wherein said capsules have body portions and cap portions which are of greater transverse dimensions than said body portions, and wherein said apparatus comprises, hopper means into which a multiplicity of said capsules are to be loaded, a continuously moveable capsule transporting conveyor having a plurality of pockets having generally upright pocket portions for receiving the capsules therein, said pockets being substantially equally spaced apart, each pocket also having a capsule receiving substantially longitudinal pocket portion arranged to carry the capsule with the capsule axis extending in approximately the direction of its movement, and each said pocket having a substantially crosswise pocket portion arranged to carry the capsule arranged substantially crosswise of the direction of its movement, means for moving said conveyor along a predetermined path with some of the capsules in a caps up attitude and others with a caps down attitude, the combination which comprises:

tilting means for tilting the caps down capsules into an attitude arranged generally along said predetermined path, means for substantially restraining said caps up capsules from such tilting movement, vacuum rectification means directed to draw transversely of said predetermined path to rectify said capsules by shifting the cap portions of those capsules which are in a caps up position, and also the cap portions of those capsules which have been tilted by said tilting means, all in a direction generally crosswise with respect to said predetermined path, and means pivotally connecting said vacuum rectification means and said transporting conveyor.

3. Apparatus as recited in claim 2 further comprising capsule retaining guides located adjacent said transport conveyor and downstream from said vacuum rectification means.

4. Apparatus as recited in claim 3 wherein said capsule retaining guide is contiguous with said vacuum rectification means.

5. Apparatus as recited in claim 2 further comprising adjustable stop means carried by said vacuum rectification means.

6. Apparatus as recited in claim 2 further comprising a pair of side frame members and wherein said transport conveyor comprises a rotatable cylinder, a shaft connecting said side frame members and located adjacent said rotatable cylinder, wherein said pivotal connection means comprise a support assembly connected to said vacuum rectification means and said shaft, a ring clamp mounted on said shaft, and a manually engageable pivot lever received in said support assembly and extending into said ring clamp whereby pivotal movement of said lever acts to connect and disconnect, on a mutually exclusive basis, said lever from said clamp ring so that said vacuum rectification means can be pivotally moved out and into position adjacent said rotatable cylinder.

7. In a capsule orienting and turning apparatus wherein said capsules have body portions and cap portions which are of greater transverse dimensions than said body portions, and wherein said apparatus comprises, hopper means into which a multiplicity of said capsules are to be loaded, a continuously moveable capsule transporting conveyor having a plurality of pockets having generally upright pocket portions for receiving the capsules therein, said pockets being substantially equally spaced apart, each said pocket also having a capsule receiving substantially longitudinal pocket portion arranged to carry the capsule with the capsule axis extending in approximately the direction of its movement, and each said pocket having a substantially crosswise pocket portion arranged to carry the capsule arranged substantially crosswise of the direction of its movement, means for moving said conveyor along a predetermined path with some of the capsules in a caps up attitude and others with a caps down attitude, the combination which comprises:

tilting means for tilting the caps down capsules into an attitude arranged generally along said predetermined path, means for substantially restraining said caps up capsules from such tilting movement, vacuum rectification means directed to draw transversely of said predetermined path to rectify said capsules by shifting the cap portions of those capsules which are in a caps up position, and also the cap portions of those capsules which have been tilted by said tilting means, all in a direction generally crosswise with respect to said predetermined path, and capsule positioning guide means interposed between said transport conveyor and said vacuum means and also disposed adjacent to said means for substantially restraining said caps up capsules from said tilting movement for retaining each said capsule in its respective pocket portion immediately prior to its being subjected to said vacuum rectification means and then releasing said capsule when it is subjected to said vacuum rectification means, wherein said vacuum rectification means comprises a vacuum manifold and wherein said capsule positioning guide means is carried by said vacuum manifold, said apparatus further comprising means pivotally connecting said vacuum manifold and said transport conveyor.

8. Apparatus as recited in claim 7 comprising capsule retaining guides located adjacent said transport conveyor and downstream from said capsule positioning guide means.

9. Apparatus as recited in claim 7 further comprising an adjustable stop member carried by said vacuum manifold to properly position said capsule positioning guide means adjacent sand transport conveyor.

10. Apparatus as recited in claim 7 further comprising a pair of side frame members and wherein said transport conveyor comprises a rotatable cylinder, a shaft connecting said side frame members and located adjacent said rotatable cylinder, said vacuum manifold attached to said shaft by said pivotal connection means and wherein said pivotal connection means comprise a support assembly connected to said vacuum manifold and said shaft, a ring clamp mounted on said shaft, and a manually engageable pivot lever received in said support assembly and extending into said ring clamp whereby pivotal movement of said lever acts to connect and disconnect, on a mutually exclusive basis, said lever from said clamp ring so that said vacuum manifold can be pivotally moved out and into position adjacent said rotatable cylinder.

* * * * *

UNITED STATES PATENT AND TRADEMARK OFFICE
CERTIFICATE OF CORRECTION

PATENT NO. : 4,231,462
DATED : November 4, 1980
INVENTOR(S) : Charles E. Ackley, Sr. and Charles E. Ackley, Jr.

It is certified that error appears in the above-identified patent and that said Letters Patent are hereby corrected as shown below:

Column 8, line 10, "sand" should read -- said --.

Signed and Sealed this

Twenty-fourth Day of February 1981

[SEAL]

Attest:

RENE D. TEGTMEYER

Attesting Officer

Acting Commissioner of Patents and Trademarks